(12) United States Patent
Andersson et al.

(10) Patent No.: US 8,870,527 B2
(45) Date of Patent: Oct. 28, 2014

(54) BEARING VIBRATION MEASURING DEVICE FOR A TURBOMACHINE

(75) Inventors: Thomas Andersson, Vreta Kloster (SE); Nigel Burns, Moira (SE)

(73) Assignee: Siemens Aktiengesellschaft, Munich (DE)

( * ) Notice: Subject to any disclaimer, the term of this patent is extended or adjusted under 35 U.S.C. 154(b) by 764 days.

(21) Appl. No.: 13/140,542

(22) PCT Filed: Dec. 17, 2009

(86) PCT No.: PCT/EP2009/067409
§ 371 (c)(1),
(2), (4) Date: Jun. 17, 2011

(87) PCT Pub. No.: WO2010/070045
PCT Pub. Date: Jun. 24, 2010

(65) Prior Publication Data
US 2011/0243712 A1   Oct. 6, 2011

(30) Foreign Application Priority Data

Dec. 18, 2008  (DE) .................. 10 2008 062 354

(51) Int. Cl.
*G01H 1/00* (2006.01)

(52) U.S. Cl.
CPC .................. *G01H 1/003* (2013.01)

USPC .......................................... 415/118; 73/866.5

(58) Field of Classification Search
USPC .......................................................... 415/142
See application file for complete search history.

(56) References Cited

U.S. PATENT DOCUMENTS

| 4,907,456 A | 3/1990 | Rozelle |
| 5,520,061 A | 5/1996 | Thibault et al. |

FOREIGN PATENT DOCUMENTS

| DE | 25 20 415 A1 | 11/1976 |
| EP | 2 034 275 A1 | 3/2009 |
| GB | 1032185 A * | 6/1966 |
| GB | 1032185 A | 6/1966 |
| JP | 60190605 A | 9/1985 |

* cited by examiner

Primary Examiner — Richard Edgar

(57) ABSTRACT

A bearing vibration measuring device for a turbo machine in which an outer housing and an inner housing are held concentrically at a distance from one another by way of at least one strut is provided. A bearing housing is disposed which is accessible from the outer housing through a radially extending access hole in the strut, the device includes a rod with an inner longitudinal end and an outer longitudinal end facing away from the inner longitudinal end, the rod being housed in access hole and being fastened at the inner longitudinal end to the bearing housing and including at least one vibration sensor on the outer longitudinal end.

18 Claims, 1 Drawing Sheet

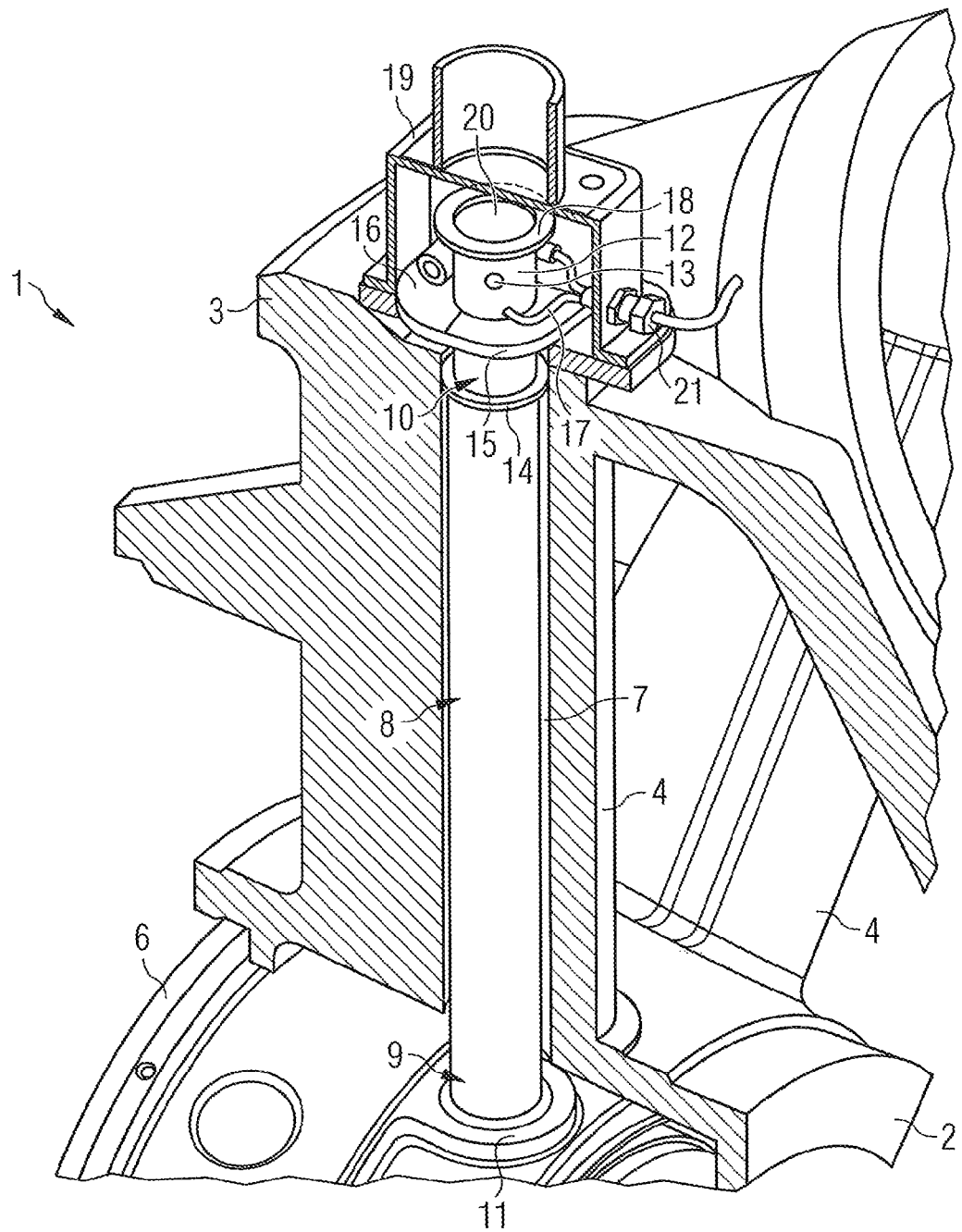

BEARING VIBRATION MEASURING DEVICE FOR A TURBOMACHINE

CROSS REFERENCE TO RELATED APPLICATIONS

This application is the US National Stage of International Application No. PCT/EP2009/067409, filed Dec. 17, 2009 and claims the benefit thereof. The International Application claims the benefits of German application No. 10 2008 062 354.7 DE filed Dec. 18, 2008. All of the applications are incorporated by reference herein in their entirety.

FIELD OF INVENTION

The invention relates to a bearing vibration measuring device for a turbomachine, and to a turbomachine which has the bearing vibration measuring device.

BACKGROUND OF INVENTION

A turbomachine, for example a gas turbine, has a rotor which is supported at its longitudinal ends by a bearing in each case. The bearings are of the lubricated rolling bearing type or lubricated tilting pad bearing type, for example. During operation of the gas turbine, the rotor rotates at an operating speed, wherein during starting of the gas turbine the rotor is brought to the operating speed from the stationary state.

The rotor has a rotor-dynamic characteristic which especially depends both on the bearing span and on the mass inertia moment and the flexural strength of the rotor and also upon the rigidity and the damping of the bearings. The rotor-dynamic characteristic of the rotor is determined by critical speeds and the associated vibration modes of the rotor. Some critical speeds lie below the operating speed so that when running up the gas turbine the rotor must pass through these critical speeds. When passing through one of the critical speeds, the vibration amplitudes of the rotor as a rule are at their greatest, but must not exceed a maximum permissible amount. For monitoring the vibration amplitudes of the rotor, the vibration behavior of the bearings is customarily monitored. For this purpose, a vibration measuring device is customarily used for measuring the vibration of the bearing. The vibration measuring device has at least one vibration sensor which is attached to the housing of the bearing.

Measuring devices for vibration measuring are already known from documents U.S. Pat. No. 5,520,061 A, EP 2 034 275 A1, U.S. Pat. No. 4,907,456 A, and JP 60-190605 A.

SUMMARY OF INVENTION

It is the object of the invention to create a bearing vibration measuring device for a turbomachine and a turbine with the bearing vibration measuring device, wherein the bearing vibration measuring device is simple and reliable.

The bearing vibration measuring device according to the invention for a turbomachine—in which, by way of at least one strut, an outer casing and an inner casing are mounted concentrically at a distance from each other, in which inner casing is arranged a bearing housing which, by means of a radially extending through-hole in the strut, is accessible from the outer casing—has a rod with an inner longitudinal end and an outer longitudinal end facing away from the inner longitudinal end, which rod is accommodated in the through-hole and is fastened by the inner longitudinal end on the bearing housing and also has at least one vibration sensor on the outer longitudinal end.

The turbomachine according to the invention has an outer casing, an inner casing, a bearing housing which is arranged in the inner casing, and at least one strut, by which the outer casing and the inner casing are mounted concentrically at a distance from each other, wherein a radially extending through-hole is provided in the strut, wherein the bearing vibration measuring device according to the invention is installed in the through-hole, is fastened by its inner longitudinal end on the bearing housing and extends by its outer longitudinal end in the outer casing.

The rod is preferably fastened by its inner longitudinal end on the bearing housing by a threaded connection. In addition, the rod has at least one supporting projection on its outer surface, by which the rod is transversely supported on the inner side of the through-hole so that the vibration amplitude of a transverse vibration mode of the rod is reduced. The rod is of elongated design and is flexible as a result. During operation of the turbomachine, the bearing housing vibrates so that vibration energy is transmitted from the bearing housing to the rod. Consequently, the rod is excited by the bearing housing so that the rod vibrates in a corresponding vibration mode. If the supporting projection is arranged in a region of the outer surface in which the rod has the highest vibration amplitude, then the vibration amplitude of the transverse vibration mode of the rod is reduced to the greatest extent. As a result, the bearing vibration measuring device has a high measuring accuracy since the measuring result of the at least one vibration sensor is not impaired by possible vibrations of the rod.

The supporting projection is preferably formed as a piston ring. As a result, the supporting projection buts against the inner wall of the through-hole along the circumference so that the supporting projection has a sealing effect in the through-hole. Therefore, the bearing housing does not come into contact with a gas which is possibly present in the outer casing.

The rod preferably has an inner passage so that the rod is formed as a tube, wherein sealing air can be delivered through the inner passage. If the rod is installed in the through-hole, which is also used as a sealing air passage in the turbomachine, then the sealing air passes through the through-hole by means of the sealing air passage. Consequently, the at least one vibration sensor is cooled by the sealing air so that during operation this vibration sensor has an advantageously low operating temperature of approximately below 130° C. Therefore, the at least one vibration sensor does not need to be designed for a higher operating temperature, as a result of which the at least one vibration sensor is of an inexpensive type of design. Furthermore, hot gas, which is possibly present in the inner casing, is prevented from reaching the outside by the sealing air.

Provision is preferably made on the outer longitudinal end for a vibration sensor mounting on which the at least one vibration sensor is attached. In addition, it is preferred that the vibration sensor mounting has three vibration sensors. As a result, the vibration sensors are provided with a redundancy, as a result of which the bearing vibration measuring device has high availability.

An encompassing plate, on which a cabling of the vibration sensors is attached, is preferably fastened on the rod. In addition, a ceramic coating is preferably applied to the cabling for thermal insulation of said cabling. The outer longitudinal end is preferably accommodated in a sealing air chamber with sealing air charging so that sealing air can flow from the sealing air chamber through the inner passage. Provision is preferably made on the sealing air chamber for a connecting socket to which the cabling is electrically connected and by which the cabling can be connected from the outside.

The vibration sensor mounting preferably has a guard plate on its outer end face for thermal insulation of the at least one vibration sensor and of the cabling. In addition, the vibration sensor mounting with the at least one vibration sensor and the plate with the cabling are preferably accommodated in the sealing air chamber. Furthermore, it is preferred that the inner side of the through-hole is provided with a wear-resistant coating. As a result, if the rod vibrates to such a degree during operation of the turbomachine that it contacts the inner wall of the through-hole, it is prevented from chafing against said inner wall of the through-hole.

In one embodiment, the inner side of the through-hole is provided with a wear-resistant coating.

BRIEF DESCRIPTION OF THE DRAWINGS

A preferred embodiment of the bearing vibration measuring device according to the invention in a turbomachine according to the invention is explained in the following text with reference to the attached schematic drawing.

FIG. 1 shows a perspective detail of the embodiment according to the invention.

DETAILED DESCRIPTION OF INVENTION

As is apparent from FIG. 1, a turbomachine 1 has an inner casing 2 and an outer casing 3. The outer casing 2 is arranged concentrically around the inner casing 3 and mounted at a distance by a multiplicity of struts 4 which are distributed evenly around the circumference. Arranged in the inner casing 2 is a bearing which is provided with a bearing housing 6 which is supported on the inner side of the inner casing 2. A radially extending through-hole 7 is provided in the strut 4, wherein a bearing vibration measuring device is installed in the through-hole 7. The bearing vibration measuring device has a rod 8 with an inner longitudinal end 9 and an outer longitudinal end 10 facing away from the inner longitudinal end 9. The rod 8 is accommodated in the through-hole 7 and, by the inner longitudinal end 9, is fastened on the bearing housing 6 by a threaded connection 11. On its outer circumference, the rod 8 has a piston ring 14 by which the rod 8 is transversely supported on the inner side of the through-hole 7.

The rod 8 is formed as a tube which has an inner passage 20. Provision is made on the outer longitudinal end 10 for a vibration sensor mounting 12 on which three vibration sensors 13 are attached. On its side facing the rod 8, the vibration sensor mounting 12 has an encompassing plate 15 on which a cabling 17 of the vibration sensors 13 is attached. A ceramic coating 16 is applied to the cabling 17 for thermal insulation of said cabling 17.

The vibration sensor mounting 12 with its vibration sensors 13 and the plate 25 is accommodated in a sealing air chamber 19 with sealing air charging so that sealing air flows from the sealing air chamber 19 through the inner passage. Provision is made on the sealing air chamber 19 for a connecting socket 21 to which the cabling 17 is electrically connected.

The vibration sensor mounting 12 has a guard plate 18 on its outer end face for thermal insulation of the vibration sensors 13 and of the cabling 17.

The invention claimed is:
1. A bearing vibration measuring device for a turbomachine, comprising:

a rod with an inner longitudinal end and an outer longitudinal end facing away from the inner longitudinal end; and a vibration sensor on the outer longitudinal end, wherein the turbomachine comprises an outer casing and an inner casing which are mounted concentrically at a distance from each other using a strut, wherein a bearing housing is arranged in the inner casing, wherein the bearing housing is accessible from the outer casing by means of a radially extending through-hole in the strut, wherein the rod is accommodated in the through-hole, and wherein the rod includes a supporting projection on an outer surface, by which the rod is transversely supported on an inner side of the through-hole so that a vibration amplitude of a transverse vibration mode of the rod is reduced.

2. The bearing vibration measuring device as claimed in claim 1, wherein the rod is fastened by the inner longitudinal end on the bearing housing by a threaded connection.

3. The bearing vibration measuring device as claimed in claim 1, wherein the rod includes an inner passage so that the rod is formed as a tube, and wherein sealing air may be delivered through the inner passage.

4. The bearing vibration measuring device as claimed in claim 1, wherein provision is made on the outer longitudinal end for a vibration sensor mounting on which the vibration sensor is attached.

5. The bearing vibration measuring device as claimed in claim 4, wherein the vibration sensor mounting includes three vibration sensors.

6. The bearing vibration measuring device as claimed in claim 5, wherein a cabling of the vibration sensors is attached on the vibration sensor mounting.

7. The bearing vibration measuring device as claimed in claim 6, wherein provision is made on the sealing air chamber for a connecting socket to which the cabling is electrically connected and by which the cabling may be connected from the outside.

8. The bearing vibration measuring device as claimed in claim 6, wherein the outer longitudinal end is accommodated in a sealing air chamber with sealing air charging so that sealing air may flow from the sealing air chamber through the inner passage, and wherein the vibration sensor mounting with the vibration sensors and the cabling is accommodated in the sealing air chamber.

9. The bearing vibration measuring device as claimed in claim 6, wherein a ceramic coating is applied to the cabling for thermal insulation of the cabling.

10. The bearing vibration measuring device as claimed in claim 4, wherein the outer longitudinal end is accommodated in a sealing air chamber with sealing air charging so that sealing air may flow from the sealing air chamber through the inner passage.

11. The bearing vibration measuring device as claimed in claim 10, wherein the vibration sensor mounting includes a guard plate on an outer end face for thermal insulation of the vibration sensor and of the cabling.

12. A turbomachine, comprising:
an outer casing;
an inner casing;

a bearing housing which is arranged in the inner casing; and a strut, by which the outer casing and the inner casing are mounted concentrically at a distance from each other, wherein a radially extending through-hole is provided in the strut, wherein a bearing vibration measuring device is installed in the through-hole, wherein the bearing vibration measuring device comprises a rod, wherein the rod is accommodated in the through-hole, wherein the rod includes a supporting projection on an outer surface, by which the rod is transversely supported on an inner side of the through-hole so that a vibration amplitude of a transverse vibration mode of the rod is reduced, and wherein the rod is fastened by the inner longitudinal end on the bearing housing and by the outer longitudinal end extends in the outer casing.

13. The turbomachine as claimed in claim 12, wherein the inner side of the through-hole is provided with a wear-resistant coating.

14. The turbomachine as claimed in claim 12, wherein the rod is fastened by the inner longitudinal end on the bearing housing by a threaded connection.

15. The turbomachine as claimed in claim 12,
wherein the rod includes an inner passage so that the rod is formed as a tube, and
wherein sealing air may be delivered through the inner passage.

16. The turbomachine as claimed in claim 12,
wherein provision is made on the outer longitudinal end for a vibration sensor mounting on which the vibration sensor is attached.

17. The turbomachine as claimed in claim 16, wherein the vibration sensor mounting includes three vibration sensors.

18. The turbomachine as claimed in claim 17, wherein a cabling of the vibration sensors is attached on the vibration sensor mounting.

* * * * *